United States Patent [19]

Richeson

[11] Patent Number: 5,300,883
[45] Date of Patent: Apr. 5, 1994

[54] POSITION SENSOR WITH VARIABLY COUPLED MAGNETIC FIELD CONDUCTING MEANS

[75] Inventor: William E. Richeson, Ft. Wayne, Ind.

[73] Assignee: North American Philips Corporation, New York, N.Y.

[21] Appl. No.: 906,973

[22] Filed: Jun. 30, 1992

[51] Int. Cl.$^5$ ............................................. G01B 7/14
[52] U.S. Cl. ............................ 324/207.22; 324/207.2; 324/207.25
[58] Field of Search ........... 324/207.2, 207.21, 207.22, 324/207.25

[56] References Cited

U.S. PATENT DOCUMENTS 4,107,591  8/1978  Herr et al. .

FOREIGN PATENT DOCUMENTS 1303818  8/1973  Fed. Rep. of Germany .
1-110215  4/1989  Japan .
1297363  11/1972  United Kingdom .

Primary Examiner—Walter E. Snow
Attorney, Agent, or Firm—Robert J. Kraus

[57] ABSTRACT

A position sensing apparatus is provided for magnetically sensing the angular positon of a shaft about an axis. The apparatus includes first and second magnetic assemblies which are rotatable relative to each other. Each of these assemblies has spaced-apart magnetic members which are magnetically coupled to each other. The members in one of the assemblies are coupled through a Hall cell.

8 Claims, 12 Drawing Sheets

POSITION SENSOR WITH VARIABLY COUPLED MAGNETIC FIELD CONDUCTING MEANS

BACKGROUND OF THE INVENTION

1. Field of the Invention

This invention relates to magnetic position sensing apparatus and in particular to such apparatus for producing and sensing a magnetic field which varies with position of a movable element.

2. Description of Related Art

It has become common practice to utilize magnetic field sensing devices, such as Hall cells, to detect the proximity of movable metallic members. Magnetic position sensing apparatus using such sensing devices are also known. However, such apparatus typically sense fringe magnetic fields and are adversely affected by stray magnetic fields. Thus they cannot make accurate position measurements in noisy environments, such as under the hoods of automobiles where extraneous magnetic fields of substantial magnitude emanate from the generator, the ignition system and various other components.

Such known magnetic position sensing apparatus are also functionally limited. Typically each known type of apparatus is capable of producing only one type of output signal, such as an output signal which varies linearly over a specific range of positions. It would be advantageous if a magnetic position sensing apparatus could be tailored to produce any one of a variety of output waveforms (e.g. linear, exponential, sinusoidal) over a selectable range of positions.

SUMMARY OF THE INVENTION

It is an object of the invention to provide a magnetic position sensing apparatus which is not significantly affected by extraneous magnetic fields.

It is another object of the invention to provide such an apparatus which can be tailored to provide any one of a variety of output signal waveforms over selectable ranges of position.

In accordance with the invention, a position sensing apparatus comprises first and second magnetic field conducting means which are rotatable with respect to each other about an axis. Each includes a plurality of magnetically permeable members having respective surfaces extending transversely of the axis, having predetermined shapes, and being separated from each other by gaps. The shaped surfaces of the first magnetic field conducting means face the surfaces of the second magnetic field conducting means and are separated from each other by a gap. The shapes, positions and areas of these surfaces are chosen to tailor the magnetic coupling between the first and second field conducting means for a desired output waveform over a selected angular range of rotation.

Third magnetic field conducting means is provided for magnetically coupling the magnetically permeable members of the first magnetic field conducting means through a sensor gap. Fourth magnetic field conducting means is provided for directly magnetically coupling the magnetically permeable members of the second magnetic field conducting means. A magnetic field producing means is also provided for effecting the production of a magnetic field having flux lines which pass through the gap between the first and second magnetic field conducting means in a direction which is substantially parallel to the axis. Sensing means, such as a Hall cell, is disposed in the sensor gap for sensing the magnetic field magnitude in tha gap. This magnitude represents the angular position of the first magnetic field conducting means relative to the other. The sensor is in a direct flux path of a magnetic circuit formed by the various field conducting means and its electrical output is not significantly affected by extraneous magnetic fields of substantial magnitudes.

DESCRIPTION OF THE PREFERRED EMBODIMENTS

Figure 1:
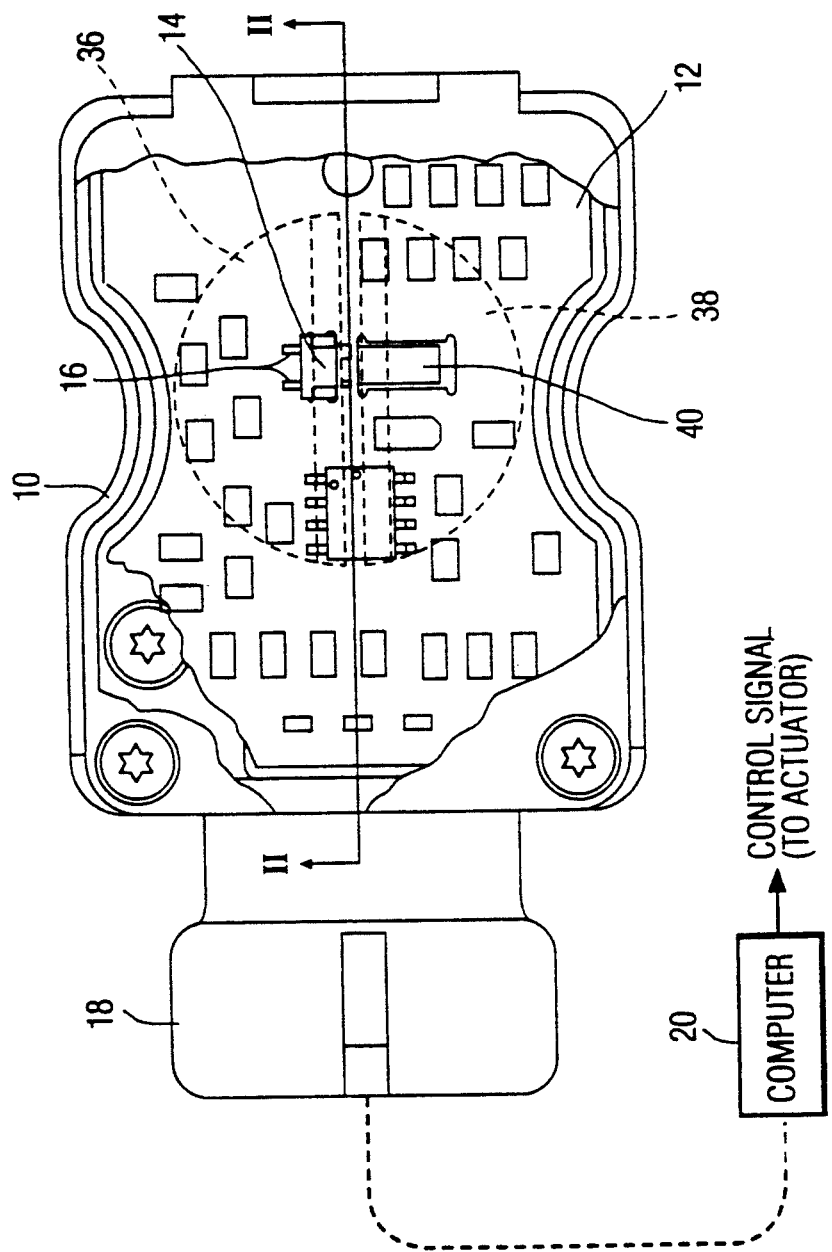
FIG. 1 is a top view of one embodiment of a position sensing apparatus in accordance with the invention.
Figure 2:
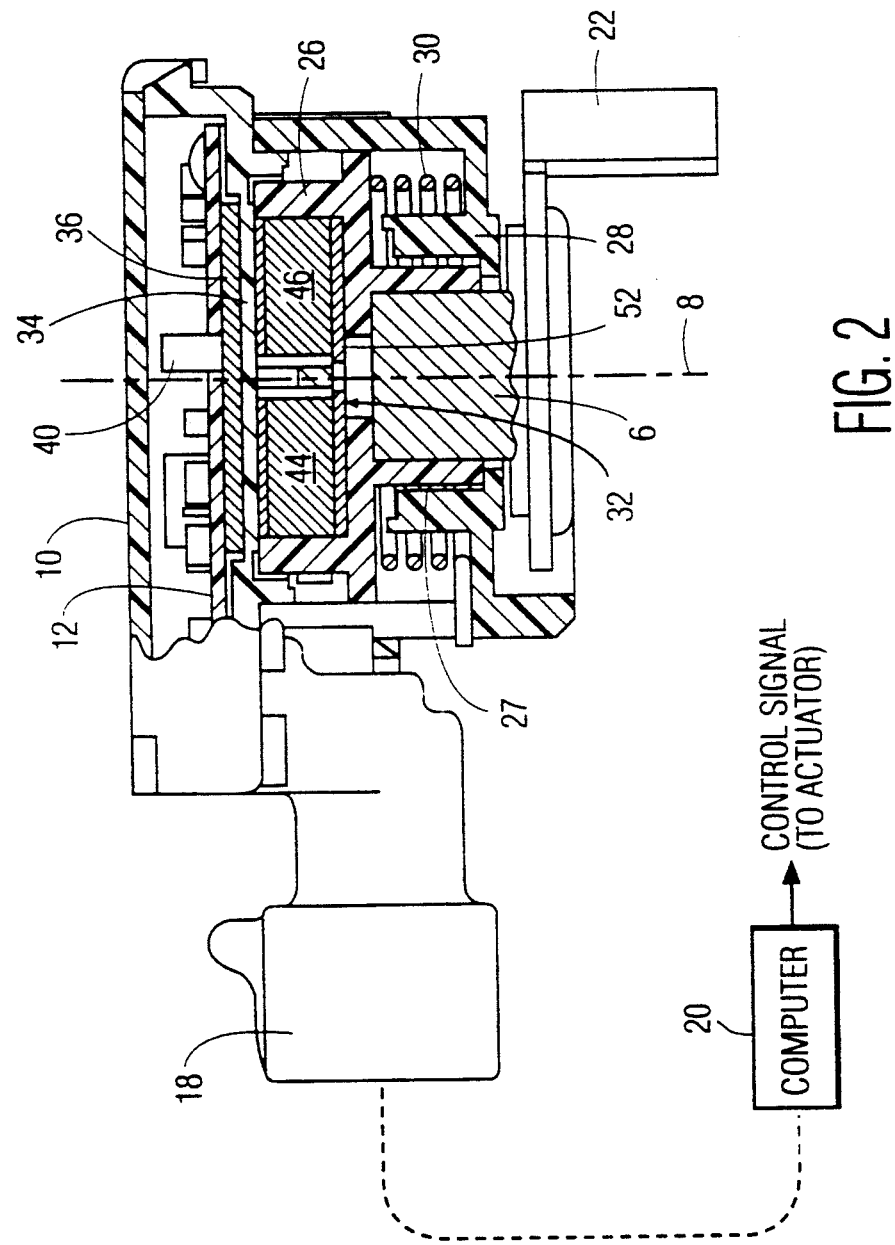
FIG. 2 is a partial sectional view of the apparatus of FIG. 1 taken along the line II—II.

FIGS. 1 and 2 illustrate an exemplary position sensing apparatus which magnetically senses the angular position of a shaft about an axis 8 relative to a stationary housing 10. Housing 10, preferably made of molded thermoplastic, contains a printed circuit board 12 which produces a position signal representing the angular position of shaft 6 about axis 8. The circuit board 12 is secured to and within the housing 10 in a fixed position. A Hall cell 14 is secured suspended via its leads 16 through an opening in the circuit board 12 for sensing the angular position of shaft 6 relative to the circuit board 12, in a manner to be described.

The circuit board 12 is electrically connected to the contacts of an electrical connector 18 which is electrically connected to a computer 20 through a cable (shown schematically). The position signal is transmitted through the cable for processing by the computer, which produces a control signal for operating an actuator (not shown). One type of actuator which advantageously can be directly controlled by digital pulses from a computer is a type of stepper motor known as a digital linear actuator. This type of motor converts rotary motion, effected by applying electrical pulses to the motor windings, to linear movement of a shaft member of the motor. A typical application is the precise positioning of an engine control member, such as a throttle arm.

As shown in FIG. 2, an arm 22 is affixed to the shaft 6 for sensing the position of a member driven by the actuator (not shown) in response to the computer-produced control signal. The shaft 6, which is made of a metal such as 1018 steel, is secured within a rotatable thermoplastic annular member 26 concentric with the axis 8. The plastic member 26 is affixed to the metal shaft 6 by injection overmolding.

One end of the annular member 26 is rotatably mounted about axis 8 within a fixed annular portion 28 of housing 10 by means of a cylindrical sleeve bearing 27 of a thermoplastic material such as polythalamid. A torsion spring 30 having one end attached to rotatable annular member 26 and having its other end attached to the annular housing portion 28 resiliently biases the annular member 26 with respect to the annular portion 28 to a predetermined angular position. Although it is not shown in FIG. 2, this is done in one version of the illustrated embodiment by seating the two ends of the torsion spring in grooves in the member 26 and housing portion 28, which have shapes and dimensions corresponding to those of the respective spring ends.

A magnetic assembly 32 is secured to and within a cavity of annular member 26, which rotates with shaft 6 in response to the movement of arm 22. The upper surface of the magnetic assembly 32 slidably contacts a thermoplastic plate member 34 which forms part of the housing 10. The plate member 34 has a thickness which defines a magnetic gap between rotatable magnetic assembly 32 and a fixed magnetic assembly 35 comprising two pole pieces in the form of plates 36 and 38. (Only pole piece 36 is shown in FIG. 2, but both are shown in FIGS. 1 and 3.)

Figure 3:
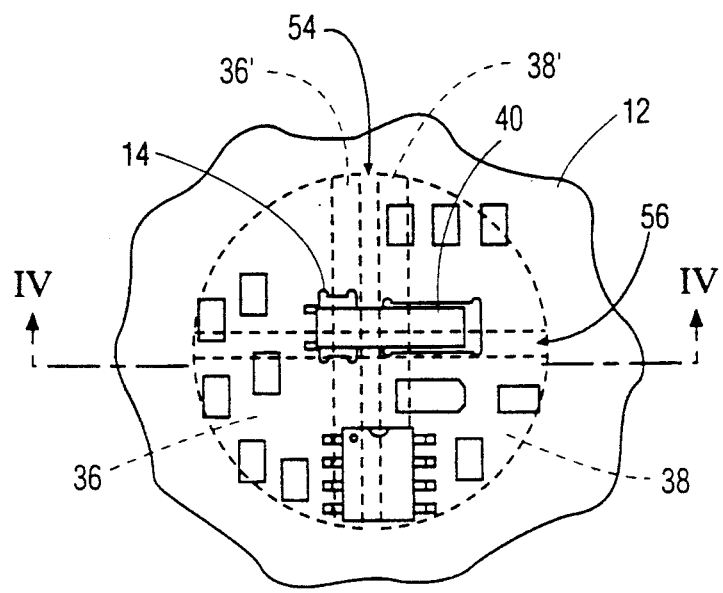
FIG. 3 is an enlarged top view of a portion of the apparatus of FIG. 1.
Figure 4:
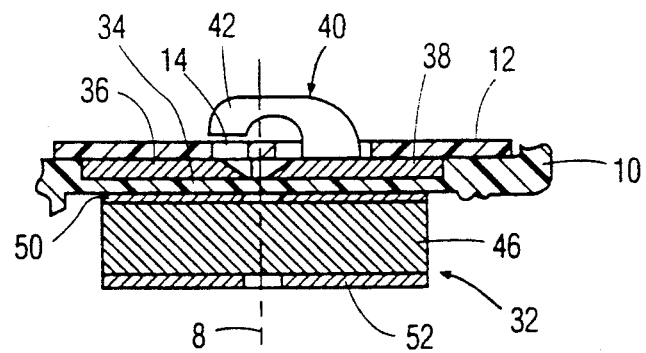
FIG. 4 is a sectional view of the portion of the apparatus shown in FIG. 3, taken along the line IV—IV.

As is more clearly shown in FIGS. 2, 3 and 4, the fixed magnetic assembly also includes a cantilevered arm 40 comprising a magnetic material of high permeability but of low magnetic retentivity, e.g. low-carbon iron, which is secured at one end to pole piece 38 in flux conductive contact. An opposite end 42 of the arm 40 extends over a region of pole piece 36 above which the Hall sensor 14 is positioned. Pole pieces 36 and 38 are bonded in a fixed position relative to the printed circuit board 12.

Figure 5:
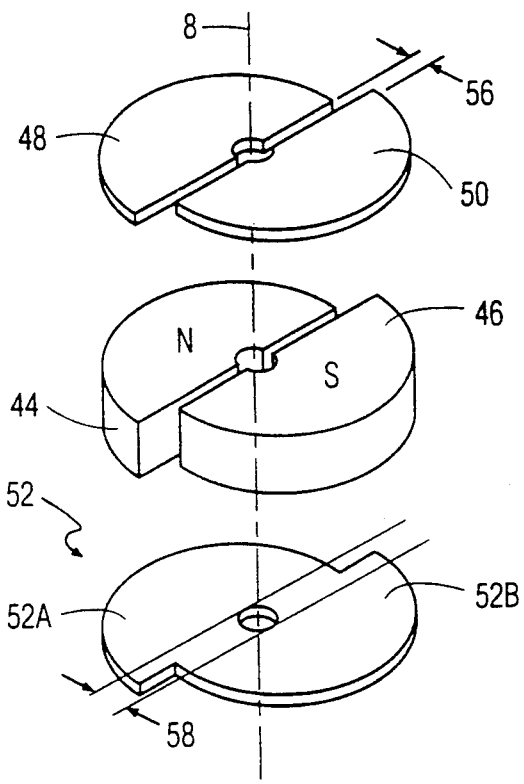
FIG. 5 is an exploded isometric view of a rotatable magnetic assembly portion of the position sensing apparatus of FIG. 1.

FIG. 5 shows the components of the magnetic assembly 32, which comprises two like-dimensioned, mirror-imaged, disk-segment magnets 44 and 46. The magnets 44 and 46 may comprise, for example, Alnico 8 material. A high-magnetic-permeability iron plate 48 having peripheral dimensions corresponding to those of magnet 44 is bonded to the upper surface of magnet 44 by means such as an epoxy. Similarly, a second plate 50, identical to plate 48, having peripheral dimensions corresponding to those of magnet 46, is bonded to the upper surface of magnet 46. A low-carbon steel plate 52 has outer peripheral dimensions that define the outer dimensions of the assembled magnetic assembly 32. The lower surfaces of the magnets 44, 46 are similarly bonded to the plate 52, which has relatively high magnetic permeability. The plates 48, 50 and 52 tend to carry a uniform flux distribution from the magnets 44 and 46 despite possible uneven flux distributions within the magnets. In a typical embodiment, pole pieces 36, 38 are plates of low-carbon (e.g. 0.04%) iron material which are each approximately 0.20 inch thick and which together define a circle having a diameter of about 0.750 inch. Plates 48 and 50 are of 0.18% carbon steel and are each approximately 0.030 inch thick. Plate 52 is of 0.18% carbon cold rolled steel (referred to as 1018 steel) and has a thickness of about 0.030 inch. Thermoplastic plate member 34 is of a material, such as polythalamid and has a thickness of about 0.040 inch.

As shown in FIG. 3, pole pieces 36 and 38 are semicircular and are spaced apart by an air gap 54. The underlying magnetic assembly 32 comprises the magnets 44 and 46 and their corresponding plates 48 and 50 which are separated by an air gap 56 of about 0.050 inch. The gap 56 overlies region 58 on the lower plate 52, (FIG. 5).

Figure 7:
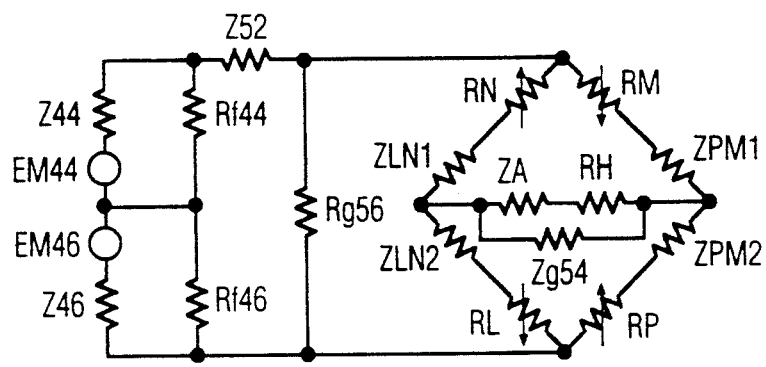
FIG. 7 is a schematic illustration of a magnetic circuit formed by the magnetic assembly arrangement.
Figure 6A:
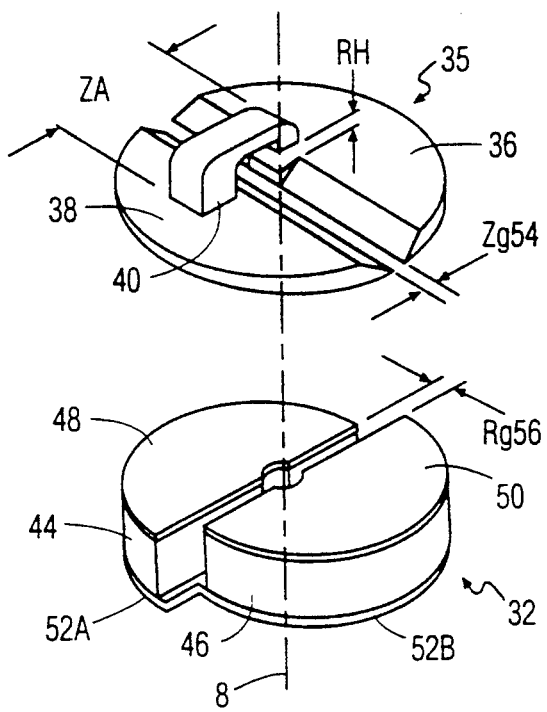
FIG. 6A is an isometric view of the rotatable magnetic assembly portion and of a fixed magnetic assembly portion of the position sensing apparatus of FIG. 1.
Figure 6B:
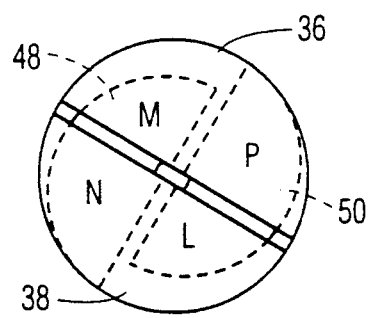
FIG. 6B is a simplified top view of a magnetic assembly arrangement produced by assembling the portions shown in FIG. 6A.

FIG. 6A shows, in perspective, with a much exaggerated separation, the arrangement along axis 8 of the fixed magnetic assembly 35 relative to the rotatable magnetic assembly 32. FIG. 6B shows, in a simplified top view, the surface areas of plates 36, 38 overlying and facing the surface areas of plates 48, 50. Together, the two magnetic assemblies, which are separated by a gap defined by the non-magnetic plate member 34 (FIG. 4), form a variable reluctance magnetic circuit which will be described in detail to facilitate an understanding of its operation. An equivalent magnetic circuit is schematically illustrated in FIG. 7. In the circuit schematic (and throughout this application) the letter R is used to designate linear reluctances (i.e. those that do not vary substantially with magnetic field strength) and the letter Z is used to designate non-linear reluctances (i.e. those that do vary substantially with magnetic field strength).

The principal reluctances of interest are included in the bridge at the right of the magnetic circuit schematic. These comprise four variable reluctances RN, RM, RL, RP, the reluctance RH of the Hall cell 14 which is disposed between arm end 42 and pole piece 36 (FIG. 4), the reluctance ZA of the arm itself, and gap reluctance Zg54. This latter reluctance, which is generally located in FIG. 6A as corresponding to air gap 54, represents the reluctance of a flux path from the pole piece 36 through underlying plates 48, 50 to pole piece 38. The facing edges of plates 36 and 38 are tapered, except at a flat portion underlying the end arm 40, to effectively increase the gap width, thereby decreasing flux leakage across the gap. The variable reluctances RN, RM, RL, RP represent the reluctances of flux paths between the plates 36, 38 and the plates 48, 50 in the respective facing regions having areas N, M, L, P. Note that the areas of these regions (and thus the reluctances RN, RM, RL, RP) change with the angular position of the plates 48, 50 as the magnet assembly 32 is rotated around the axis 8.

The reluctances ZPM1, ZPM2, ZLN1, ZLN2 represent non-linear reluctances associated with the plates 36 and 38. Specifically, ZPM1 and ZPM2 represent the combined reluctances of a flux path through plate 36 from area P of plate 50 to area M of plate 48. Similarly, ZLN1 and ZLN2 represent the combined reluctances of a flux path through plate 38 from area L of plate 50 to area N of plate 48. These reluctances are small compared to RN, RM, RL, RP (with which they are in magnetic series) and have only a second order affect on the magnitude of flux passing through the Hall cell.

The left side of FIG. 7 illustrates the magnetic fields EM44, EM46 produced by the magnets 44, 46 (e.g. 2000 gauss each) and reluctances associated with the magnets themselves and adjacent plates 48, 50 and 52. Z44 and Z46 represent the reluctances of the paths of the flux passing through the magnets 44 and 46 and through the adjacent plates 48, 50, 52. Rf44 represents the reluctance of the path of the fringe flux, around the periphery of magnet 44, passing from the edges of plate 48 to the edges of a corresponding region 52A of plate 52. Similarly, Rf46 represents the reluctance of the path of fringe flux, around the periphery of magnet 46, passing from the edges of plate 50 to the edges of a corresponding region 52B of plate 52. Z52 represents the reluctance of a flux path through a region of plate 52 disposed between the regions 52A and 52B. Rg 56 represents the reluctance of a flux path through the gap 56 between the plates 48 and 50.

The linear/non-linear characteristics of the various reluctances, and their affects on the operation of the position-sensing apparatus, will now be described with reference to FIGS. 5 through 8. Generally, it should be noted that the flux magnitudes passing through the various reluctances vary as the magnetic assembly 32 is rotated away from a null position, where the four reluctances RN, RM, RL, RP are equal to each other. At this position, no flux passes through the Hall cell.

Figure 8A:
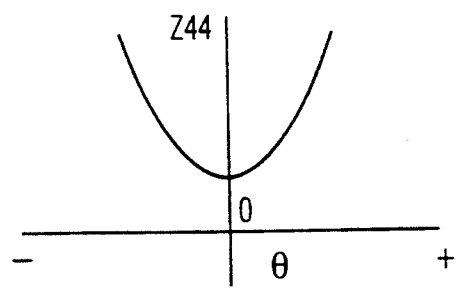
FIGS. 8A through 8D are diagrams showing the non-linearities of reluctances in the magnetic circuit of FIG. 7.
Figure 8B:
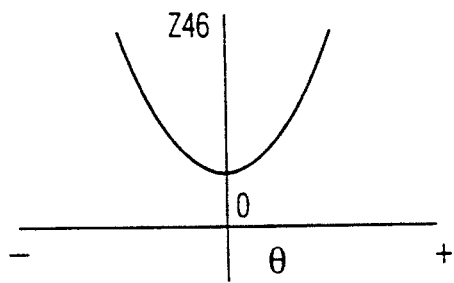
Figure 8C:
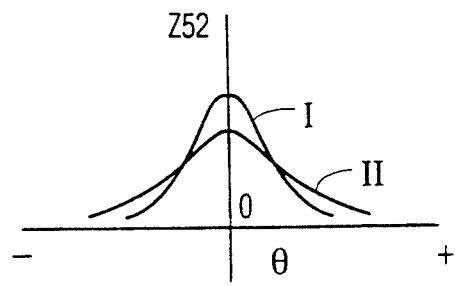
Figure 8D:
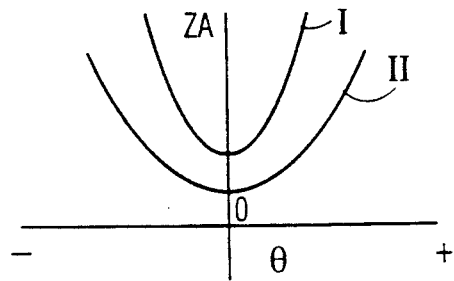

The magnitudes of the reluctances Z44, Z46, Z52 and ZA vary non-linearly with the magnitude of the flux passing through the magnetic circuit. This non-linear variation is represented by the curves in FIGS. 8A, 8B, 8C and 8D, respectively, with $\theta$ representing the angle of rotation of the magnetic assembly 32 away from the null position ($\theta=0$). From FIGS. 8A, 8B and 8D it can be seen that the reluctances Z44, Z46 and ZA vary parabolically with $\theta$. In FIG. 8C, two different curves (I and II) are shown for the reluctance Z52. Curve I represents the reluctance Z52 if plate 52 has a first thickness, while curve II represents the reluctance Z52 if the plate 52 has a second, larger thickness. If the thickness is further increased, eventually a thickness will be reached where the reluctance becomes constant, regardless of the magnitude of flux passing through the plate 52. In FIG. 8D, two different curves (I and II) are also shown for the reluctance ZA. Curve I represents the reluctance ZA if the arm 40 has a first, smaller cross-sectional area, while curve II represents the reluctance ZA if the arm has a second, larger cross-sectional area. As is the case of the plate 52, if the cross-sectional area of the arm 40 is further increased, eventually an area will be reached where the reluctance becomes constant, regardless of the magnitude of flux passing through the arm.

Note that the curves for the reluctances Z44, Z46 and ZA are similar to, but inverted from, the curves for the reluctance Z52. By adjusting the thickness of the plate 52 and the cross-sectional area of the arm 40, the non-linearity of reluctance Z52 can be made to substantially counteract that of reluctances Z44, Z46 and AZ, with which reluctance Z52 is effectively in series magnetic connection.

The non-linear leakage reluctance Zg54 could be minimized by maximizing the width of the gap 54 between the plates 36 and 38. If the gap width is made large, however, this will decrease the linearity and increase the rate of change of the ratios of the areas N:L and M:P as a function of the rotation angle $\theta$. Therefore, the gap 54 is made small (e.g. 0.040 inch) and the edges of plates 36, 38 bounding the gap 54 are tapered away from each other to minimize flux leakage across the gap. This does not significantly affect the ratios of the areas N,M,L,P, which are determined by the facing surfaces of the plates 36,38 and 48,50.

The reluctances Rf44, Rf46 and Rg56 do not affect the linearity of the circuit, but should significantly affect the sensitivity of the circuit if they shunt substantial flux away from the bridge reactances. However, all three of these reactances are through low magnetic permeability air gaps and collectively they shunt only an insignificant amount of flux away from the bridge.

The magnitudes of the reluctances RN, RM, RL, RP are inversely proportional to the respective areas N, M, L, P. The areas themselves are determined by the shapes and rotational positions of the two halves of the magnetic assembly 32. Note that in this exemplary embodiment, each of the magnets 44, 46 and the respective plates 48, 50 have a log-spiral shape, which facilitates tailoring the design of the position sensing apparatus for operation at a desired angular range.

Figure 9:
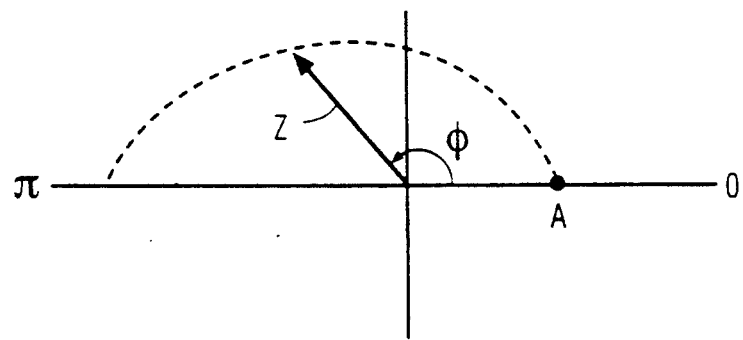
FIG. 9 is a graph of a geometric shape useful in describing the shapes of magnetic assemblies used in various embodiments of the invention.

The log-spiral shape is defined by the equation:

$$z = Ae^{\gamma\phi}$$

which is plotted in FIG. 9 over an angular sector of 180° and corresponds to the shape of each of the two halves of the magnetic assembly 32. Note that the degree of asymmetry of the 180° sector depends on the value of $\gamma$. Of particular interest is the value $\gamma=1$, for which the log-spiral shape becomes a semicircle of radius A and where the angle $\phi=90°$ locates a line which divides the shape into two equal areas. Such a semicircular shape would be useful in a design where the null point occurs at the center of the angular range of operation of the position sensing apparatus. However, if an off center null position is desired, then the following equation can be solved for $\gamma$ to define the appropriate 180° log-spiral shape:

$$\phi = \frac{1}{2\gamma} \ln\left(\frac{(e^{2\gamma\pi} + 1)}{2}\right)$$

The above equation locates the angle $\phi$ at which the log spiral shape is divided into two equal areas.

Figure 10:
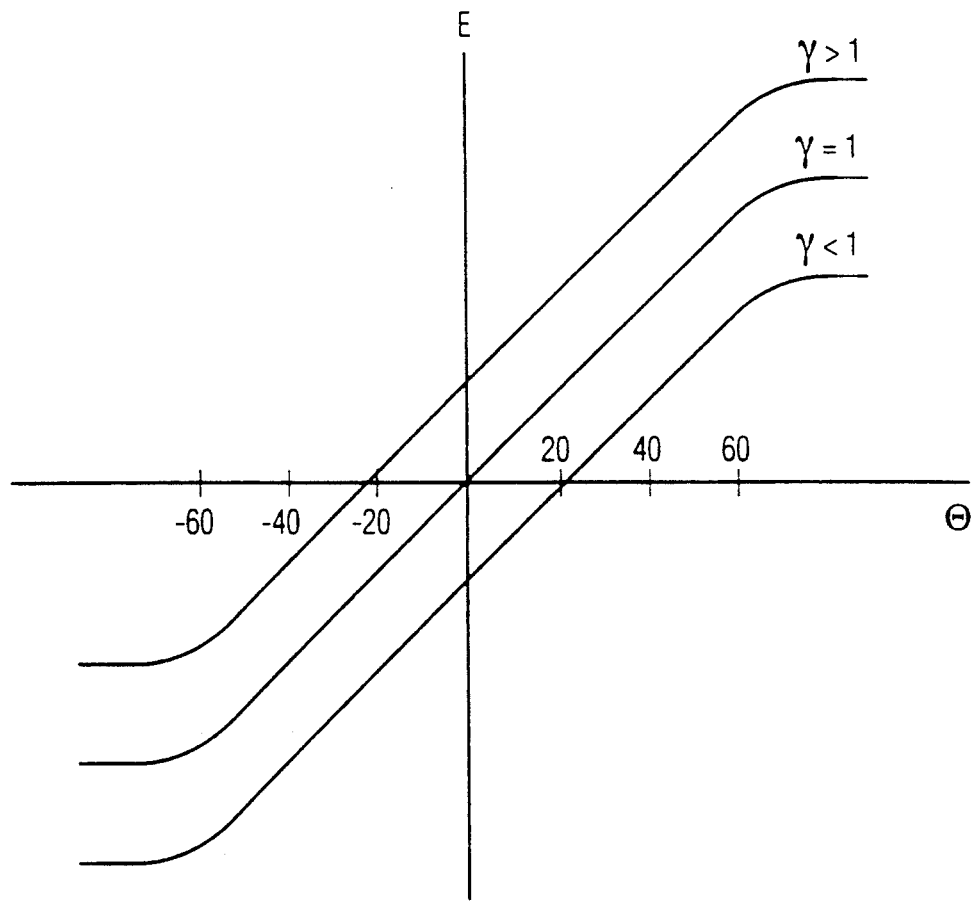
FIG. 10 is a diagram showing various response curves possible with the magnetic assemblies of FIG. 6A.

The curves in FIG. 10 generally illustrate the variation of the Hall cell output voltage E with the rotational position $\theta$ of the rotatable magnetic assembly 32, for different values of $\gamma$. For $\gamma=1$ (i.e. for a circular log spiral shape), the null point (E=0) occurs at $\theta=0°$ and the linear range of output voltages extends equiangularly for rotation of the magnetic assembly 32 in either direction. For values of $\gamma$ which are greater than 1, the null point occurs at a negative angle and the linear range of output voltages extends over a greater range for positive rotation than for negative rotation. For values of $\gamma$ which are smaller than 1, the null point occurs at a positive angle and the linear range of output voltages extends over a greater range for negative rotation than for positive rotation.

In a test version of the above described embodiment having a magnetic assembly 32 with log spiral shaped elements for which $\gamma=1$, and utilizing a type LT135A Hall cell from Sharp Electronics Corporation of Camos, Wash., the Hall cell produced a linear output which varied from $-0.28$ volts to $+0.28$ volts over an angular range of rotation from $\theta=-70°$ to $\theta=+70°$. The null point occurred at $\theta=0°$. In the test version, the Hall cell output was amplified by a gain of 14.3 before being transmitted through the cable to the computer 20.

Figure 11A:
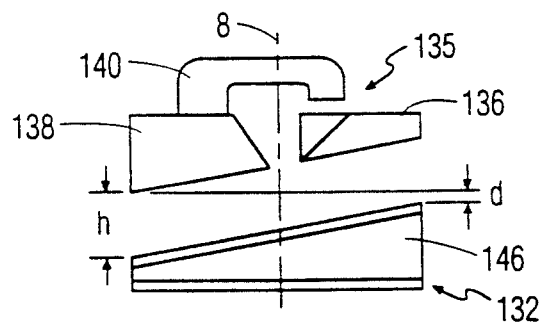
FIGS. 11A through 11C are various views of a second embodiment of a magnetic assembly arrangement which may be used in a position sensing apparatus according to the invention.
Figure 11B:
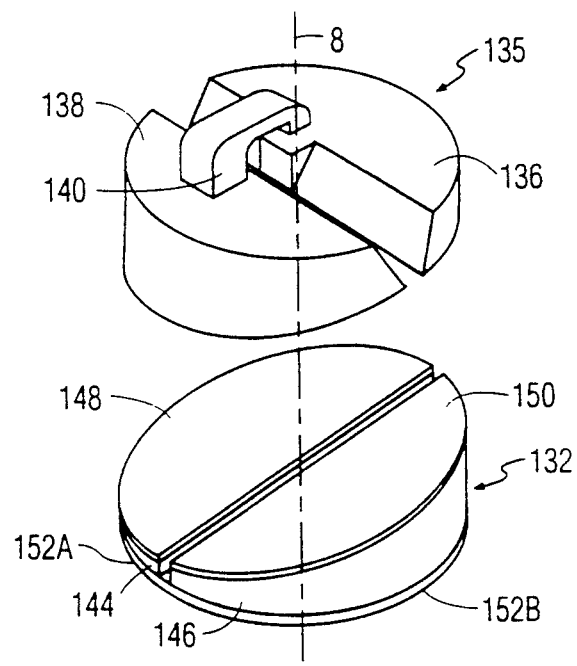
Figure 11C:
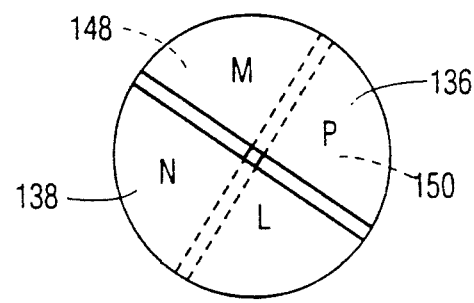

FIG. 11 illustrates a second embodiment of a magnetic assembly arrangement which may be utilized in a position sensing apparatus such as that of FIG. 2 in place of the two assemblies 32 and 35. The parts in FIG. 11 are numbered 100 higher than corresponding parts in FIG. 6.

The magnetic assemblies 132 and 135 comprise log spiral shaped elements (in this case circular), form a magnetic circuit represented by the circuit schematic shown in FIG. 7, and have operating characteristics similar to the magnetic assemblies 32 and 35. However, as is best shown in the side view illustration of FIG 11A, each of the magnetic assemblies 132, 135 has a wedge shape. This shape is determined by the magnets 144, 146 for the rotatable magnetic assembly 132, and by the pole plates 136, 138 for the stationary magnetic assembly 135.

In the rotational position shown in all three of FIGS. 11A, B, C, where plates 136, 138 are oriented orthogonally with respect to plates 148, 150 (i.e. $\theta=0°$), facing planar surfaces defined by these two pairs of plates are uniformly separated by an axial distance h (measured parallel to axis 8). The axial distance d represents the thickness of the thermoplastic plate member 34 shown in FIGS. 2 and 4.

As the rotatable magnetic member 132 is rotated in either direction, the average distance between the facing surfaces of plates 138 and 150 changes in one direction (e.g. decreases) while the average distance between the facing surfaces of plates 136 and 148 changes in the other direction (e.g. increases). These variations in distance will affect the changes in the reluctances RN,RM,RL,RP with $\theta$ more significantly than the changes in the areas N,M,L,P. This is because the reluctances change inversely with changes in the respective areas, but change proportionately to the square of the distance h.

Figure 12:
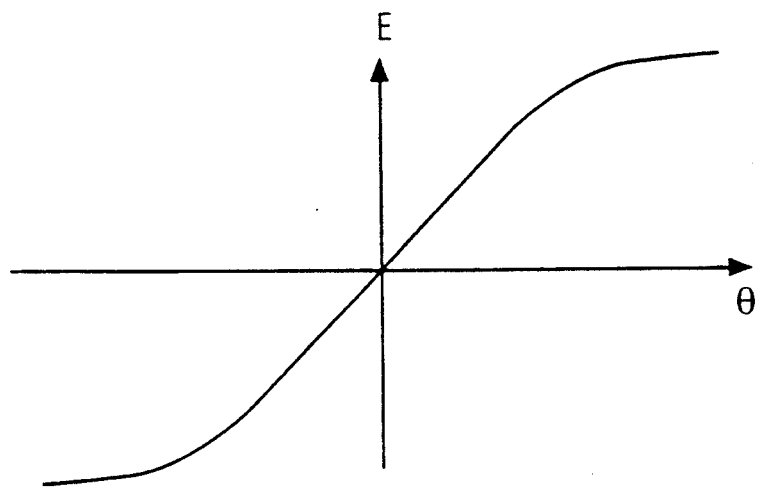
FIG. 12 is a diagram showing a typical response curve for the magnetic assembly arrangement of FIG. 11.

The curve in FIG. 12 generally illustrates the variation of the Hall cell output voltage E with the rotational position $\theta$ of the magnetic assembly 132. Note that the null occurs at $\theta=0°$ and the curve is sinusoidal over an angular range which is approximately equivalent to that of the FIG. 6 embodiment.

Figure 13A:
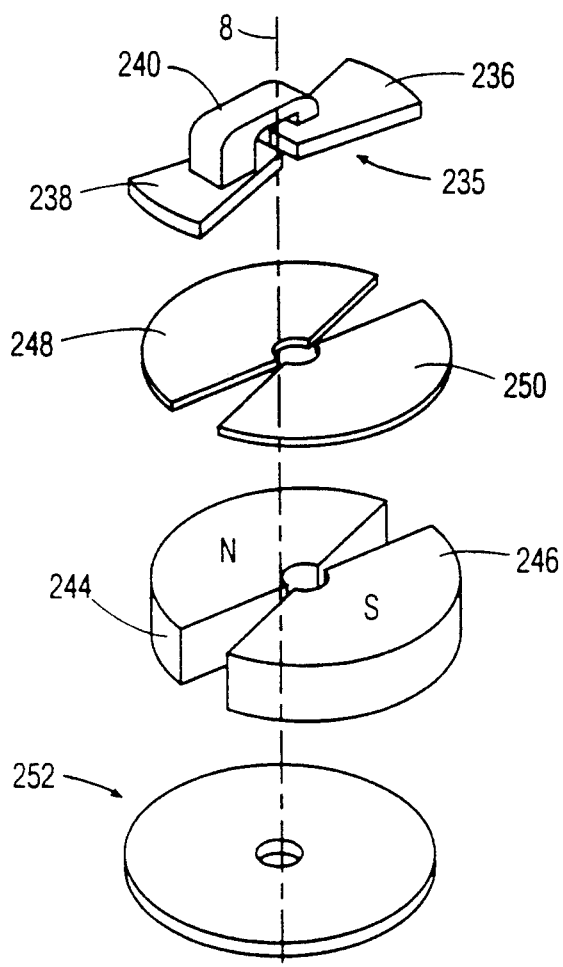
FIGS. 13A and 13B are various views of a third embodiment of a magnetic assembly arrangement which may be used in a position sensing apparatus according to the invention.

FIG. 13 illustrates a third embodiment of an arrangement of magnetic assemblies which may be utilized in a position sensing apparatus such as that of FIG. 2. The parts in FIG. 13 are numbered 200 higher than corresponding parts in FIG. 6.

Figure 13B:
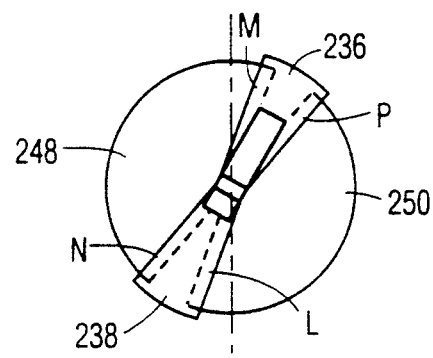

The magnetic assemblies 232 and 235 comprise circular log-spiral-shaped elements, form a magnetic circuit represented by the circuit schematic shown in FIG. 7, and have operating characteristics similar to the magnetic assemblies 32 and 35. However, as is best shown in FIG. 13B, which illustrates the relative positions of the magnetic assemblies at $\theta=0$, the areas N,M,L,P collectively occupy only a relatively small portion of the 360° total area of the two assemblies and exist over only a relatively small degree of rotation of the magnetic member 232.

Figure 14:
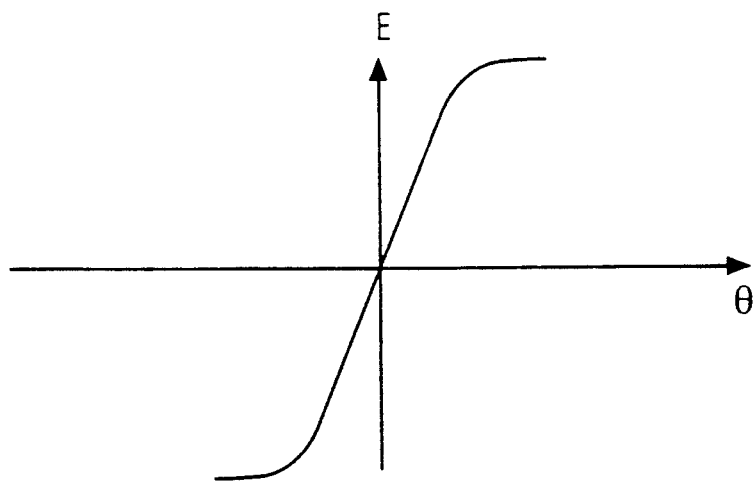
FIG. 14 is a diagram showing a typical response curve for the magnetic assembly arrangement of FIG. 13.

The curve in FIG. 14 generally illustrates the variation of the Hall cell output voltage E with the rotational position $\theta$ of the magnetic assembly 232. Note that the null occurs at $\theta=0°$ and the curve has a linear portion of large slope which extends over only a small angular range of rotation. This arrangement is useful in applications where a small range of motion must be detected with a maximum sensitivity.

Figure 15A:
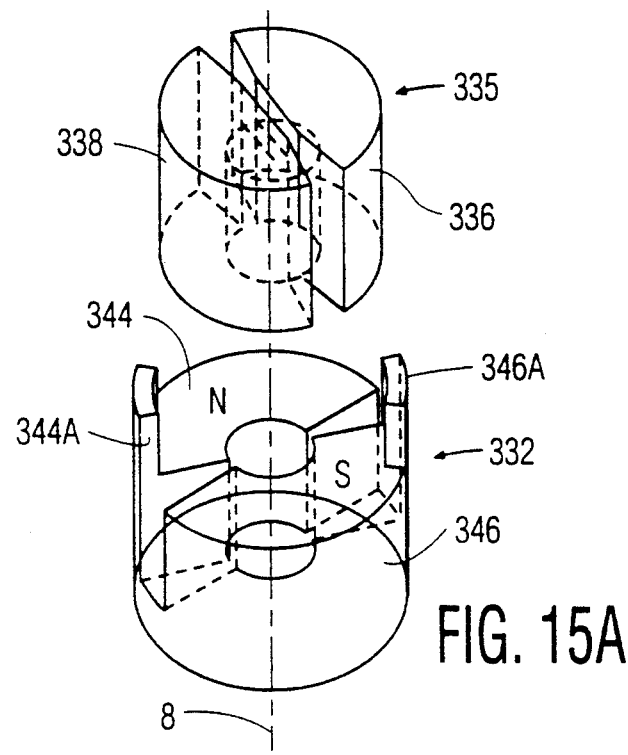
FIGS. 15A, 15B, and 15C are various views of a fourth embodiment of a magnetic assembly arrangement which may be used in a position sensing apparatus according to the invention.
Figure 15B:
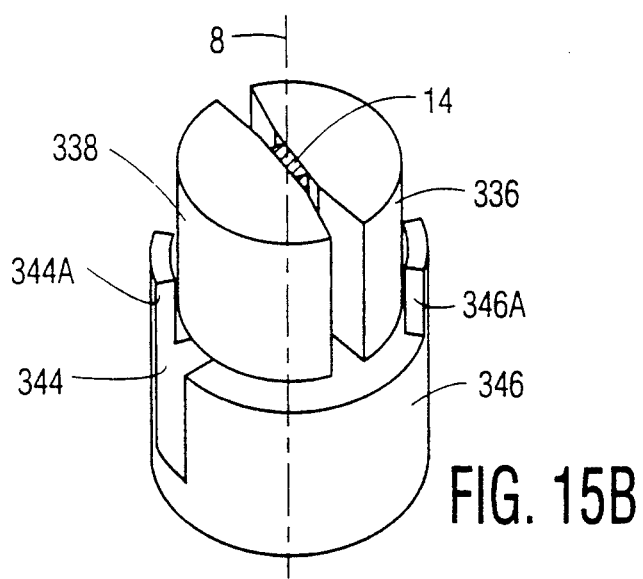
Figure 15C:
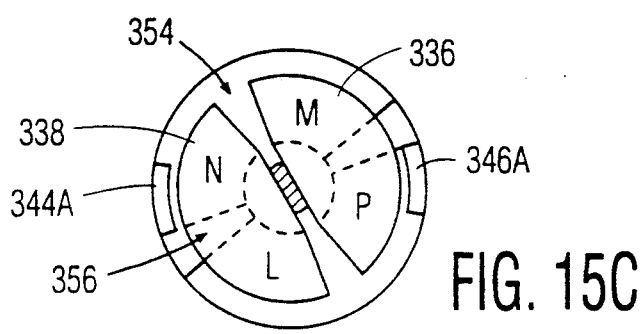

FIG. 15 illustrates a fourth embodiment of an arrangement of magnetic assemblies which may be utilized in a position sensing apparatus such as that of FIG. 2. The parts in FIG. 15 are numbered 300 higher than corresponding parts in FIG. 6.

The magnetic assembly 335 comprises circular log-spiral-shaped elements 336 and 338 with respective slots for holding opposite ends of the Hall cell 14, which spans a gap between these elements. The magnetic assembly 332 comprises an integral, permanently magnetized element with tabs 344A and 346A extending axially from respective circular portions 344 and 346. These tabs add to the respective surface areas of portions 344 and 346 which face corresponding areas of the elements 336 and 338. The tabs effect an angular offset of the null position with respect to the rotational position where the gaps 354 and 356 are mutually orthogonal, i.e. $\theta=0°$.

Figure 16:
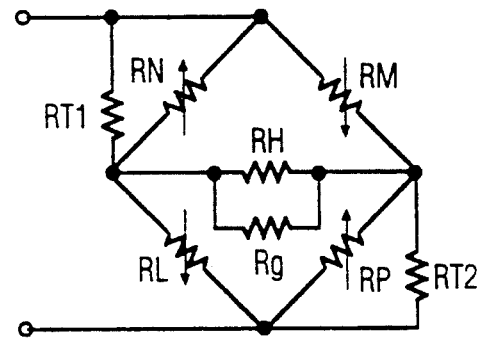
FIG. 16 is a schematic illustration of a magnetic circuit formed by the magnetic assembly arrangement of FIG. 15.

FIG. 16 schematically illustrates the bridge portion of the magnetic circuit formed by the magnetic assemblies of FIG. 15. Note that all of the reactances are linear, with RT1 and RT2 representing the reactances of the gaps between the tabs and the corresponding facing areas of elements 336 and 338. The reactance Rg represents the reluctance of the gap 354 between elements 336 and 338.

Figure 17:
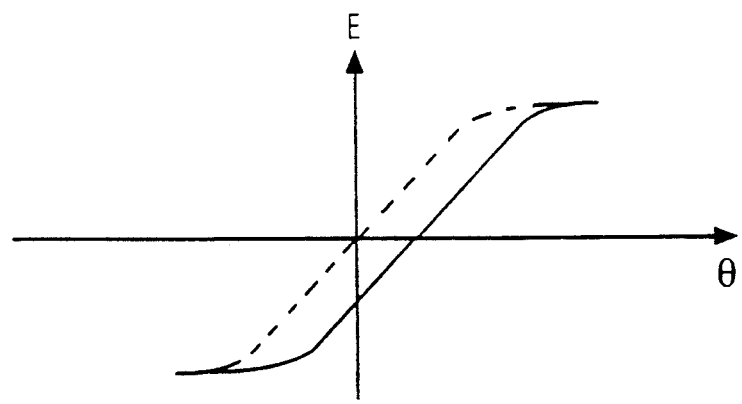
FIG. 17 is a diagram showing typical response curves for the magnetic assembly arrangement of FIG. 15.

The solid-line curve in FIG. 17 generally illustrates the variation of the Hall cell output voltage E with the rotational position $\theta$ of the magnetic assembly 332. Note that the null (E=0) occurs at an offset from $\theta=0°$ because of the angular positioning of the tabs 344A, 346A. The dashed-line curve illustrates the output of the Hall cell if the tabs are removed or are centrally located along the peripheries of their respective elements 344, 346. Note that both curves are sinusoidal.

I claim:
1. A position sensing apparatus comprising:
   a. first magnetic field conducting means including first and second members of magnetically permeable material having respective surfaces extending transversely of a rotational axis, said surfaces having predetermined shapes and being separated by a first gap;
   b. second magnetic field conducting means including third and fourth members of magnetically permeable material having respective surfaces extending transversely of the axis, said surfaces having prede- termined shapes, being separated from each other by a second gap, facing the surfaces of the first magnetic field conducting means, and being separated from said surfaces by a third gap;

c. third magnetic field conducting means for magnetically coupling the first and second members through a fourth gap;

d. fourth magnetic field conducting means for directly magnetically coupling the third and fourth members;

e. magnetic field producing means magnetically coupled to one of the first and second magnetic field conducting means for effecting the production of a magnetic field having flux lines which pass through the third gap between said first and second magnetic field conducting means in a direction which is substantially parallel to the axis;

f. means for mounting the first and second magnetic field conducting means such that at least one of said field conducting means is rotatable about the axis relative to the other; and g. sensing means disposed in the fourth gap for sensing the magnetic field magnitude in said gap, said magnitude representing the angular position of the first magnetic field conducting means relative to the other.

2. A position sensing apparatus as in claim 1 where the sensing means comprises a Hall sensor.

3. A position sensing apparatus as in claim 1 where the magnetic field producing means comprises at least one permanent magnet.

4. A position sensing apparatus as in claim 3 where the magnetic field producing means comprises permanent magnet means attached to one of the first and second magnetic field conducting means.

5. A position sensing apparatus as in claim 3 where the at least one permanent magnet comprises a permanently magnetized part of one of the first and second magnetic field conducting means.

6. A position sensing apparatus as in claim 1 where the facing surfaces of the first, second, third and fourth members each have a log spiral shape.

7. A position sensing apparatus as in claim 1 where each the first and second gaps defines a constant spacing between the respective surfaces separated thereby.

8. A position sensing apparatus as in claim 1 where the third gap defines a spacing between the respective surfaces separated thereby which varies with said angular position.

* * * * *